US009356872B2

(12) United States Patent
Uzelac et al.

(10) Patent No.: US 9,356,872 B2
(45) Date of Patent: May 31, 2016

(54) LOAD BALANCING OF NETWORK COMMUNICATIONS

(71) Applicant: Level 3 Communications, LLC, Broomfield, CO (US)

(72) Inventors: Adam Charles Uzelac, Rochester, NY (US); Paul Edward Erkkila, Palmyra, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 149 days.

(21) Appl. No.: 13/871,932

(22) Filed: Apr. 26, 2013

(65) Prior Publication Data

US 2013/0286836 A1 Oct. 31, 2013

Related U.S. Application Data

(60) Provisional application No. 61/639,754, filed on Apr. 27, 2012.

(51) Int. Cl.
| | |
|---|---|
| *H04L 12/803* | (2013.01) |
| *H04L 29/08* | (2006.01) |
| *H04L 12/725* | (2013.01) |
| *H04L 29/06* | (2006.01) |
| *H04M 3/00* | (2006.01) |
| *H04M 3/36* | (2006.01) |
| *H04N 21/231* | (2011.01) |
| *H04N 21/643* | (2011.01) |

(52) U.S. Cl.
CPC ............ *H04L 47/125* (2013.01); *H04L 45/306* (2013.01); *H04L 63/0428* (2013.01); *H04L 65/00* (2013.01); *H04L 65/105* (2013.01); *H04L 67/1014* (2013.01); *H04M 3/00* (2013.01); *H04M 3/367* (2013.01); *H04L 67/1002* (2013.01); *H04L 67/288* (2013.01); *H04N 21/23103* (2013.01); *H04N 21/643* (2013.01)

(58) Field of Classification Search
USPC .................................................. 370/237, 395.5
See application file for complete search history.

(56) References Cited

U.S. PATENT DOCUMENTS

| | | | |
|---|---|---|---|
| 7,707,295 B1 * | 4/2010 | Szeto et al. | ................... 709/229 |
| 8,059,653 B1 | 11/2011 | Wang et al. | |

(Continued)

FOREIGN PATENT DOCUMENTS

WO    WO-2010147721  A1    12/2010

OTHER PUBLICATIONS

International Search Report, dated Jul. 3, 2013, Int'l Appl. No. PCT/US13/038524, Int'l Filing Date Apr. 26, 2013, 3 pgs.
Written Opinion of the Int'l Searching Authority, dated Jul. 3, 2013, Int'l App. No. PCT/US13/038524, Int'l Filing Date Apr. 26, 2013, 6 pgs.

(Continued)

*Primary Examiner* — Hoon J Chung (57) ABSTRACT

Aspects of the present disclosure involve systems, methods, computer program products, and the like, for balancing or routing a received communication on a telecommunications network among a plurality of network devices. More particularly, a load balancing unit is associated with a telecommunications network that receives communications from one or more network devices intended for transmission through that network and selects an associated component of the network to process the communication.

18 Claims, 5 Drawing Sheets

(56) References Cited

U.S. PATENT DOCUMENTS

| | | | |
|---|---|---|---|
| 8,738,710 B1* | 5/2014 | Du et al. | 709/206 |
| 2003/0023744 A1* | 1/2003 | Sadot et al. | 709/234 |
| 2003/0056002 A1 | 3/2003 | Trethewey | |
| 2007/0153813 A1* | 7/2007 | Terpstra et al. | 370/401 |
| 2007/0258465 A1* | 11/2007 | Ma et al. | 370/395.53 |
| 2008/0282254 A1 | 11/2008 | Blander et al. | |
| 2009/0049173 A1 | 2/2009 | Pulito et al. | |

OTHER PUBLICATIONS

International Preliminary Report on Patentability, dated Oct. 28, 2014, Int'l Appl. No. PCT/US13/038524; Int'l Filing Date Apr. 26, 2013; 8 pgs.

Partial Supplementary European Search Report, dated Nov. 2, 2015, Application No. 13781145.1, filed Apr. 26, 2013; 7 pgs.

Extended European Search Report, dated Feb. 23, 2016, Application No. 13781145.1, filed Apr. 26, 2013; 12 pgs.

* cited by examiner

LOAD BALANCING OF NETWORK COMMUNICATIONS

CROSS-REFERENCE TO RELATED APPLICATIONS

This application claims priority under 35 U.S.C. §119(e) to provisional patent application 61/639,754 titled "LOAD BALANCING OF SIP-BASED COMMUNICATIONS", filed on Apr. 27, 2012 and of which is hereby incorporated by reference herein.

TECHNICAL FIELD

Aspects of the present disclosure generally relate to systems and methods that provide for balancing of communications transmitted on a telecommunications network between a plurality of network devices, and more specifically for communications based on Session Initiation Protocols (SIP).

BACKGROUND

Telecommunication networks provide for the transmission of information across some distance through terrestrial, wireless or satellite communication networks. Such communications may involve voice, data or multimedia information, among others. Typically, a user or customer to the telecommunications network utilizes a communication device, such as a telephone, to transmit and receive one or more communications to and from another user of the network. Thus, the network provides any number of components interconnected in such a manner as to facilitate the transmission of communications between two or more users of the network.

As more and more customers are added to a telecommunications network, the flow and handling of the various communications transmitted across the network (known as traffic) becomes important to prevent slow or improper processing of the transmitted communications. For example, many of the components of the network are limited in the number of communications that can be processed at any one time. Providing too many communications to the component for processing at one time may result in dropped communications, mishandled communications or a malfunction of the component. Thus, a properly functioning telecommunications network generally manages the flow of traffic through the network to maximize the efficiency of the traffic flow and prevent overloading any one component or system of the network One method to ensure that a component of a network is not overloaded is by hard-wiring or dedicating communications to a particular component. For example, many networks dedicate a particular component to receive communications from a set number of user communication devices. This particular component is then wired directly to the ingress port for the user's communication devices such that the component is dedicated to process the communications related to that ingress port. However, this type of network structure can be inefficient for several reasons. For example, a component of the network may, at any one time, be processing far fewer communications then the component is capable of processing, depending on the number of ports being used by customers at that time. In another example, a customer's needs may increase over time such that more ports or network components are requested by the customer. However, the addition of more ports or components to the customer may be costly or inconvenient for the customer.

It is with these and other issues in mind that various aspects of the present disclosure were developed.

SUMMARY

One implementation of the present disclosure may take the form of a system for processing a communication over an Internet Protocol (IP) based communication network. The system comprises a plurality of SIP proxy components in a telecommunications network and a load balancing device in communication with the plurality of SIP proxy components and in communication with at least one user device. The load balancing device is configured to receive a first communication from the at least one user device and select one SIP proxy component from the plurality of SIP proxy components to process the first communication. Further, the load balancing device is further configured to transmit one or more Session Initiation Protocol (SIP) based messages to the selected one SIP proxy component from the plurality of SIP proxy components and the at least one user device to route the first communication to the selected one SIP proxy component.

Another implementation of the present disclosure may take the form of a method for processing a network communication to a telecommunications network. The method includes the operations of obtaining, at a load balancer, technical information of at least one network component of a plurality of network components, wherein each of the plurality of network components is in communication with the load balancer and storing the received technical information in a database associated with the load balancer. Further, the method includes the operation of receiving, at the load balancer, a user communication intended for transmission on a telecommunications network, the user communication transmitted by a user device associated with a user network in communication with the telecommunications network, selecting a first network component from the plurality of network components, wherein the selecting the first network component is based at least on the received technical information of the at least one network component and transmitting at least one routing message to establish a communication session between the user device and the first network component.

Yet another implementation of the present disclosure may take the form of a method for operating a telecommunications network. The method includes the operations of obtaining, at a load balancer, technical information of at least one network component of a plurality of network components, wherein each of the plurality of network components is in communication with the load balancer and the technical information comprises at least a transmission protocol of each of the plurality of network components, storing the received technical information in a database associated with the load balancer and receiving, at the load balancer, a communication intended for a telecommunications network, the received communication transmitted by a user device associated with a user network in communication with the telecommunications network. In addition, the operations include analyzing the received communication to determine a transmission protocol of the received communication, converting the received communication to a transmission protocol corresponding to the technical information of the at least one network component and transmitting at least one routing message to establish a communication session between the user device and the at least one network component.

DETAILED DESCRIPTION

Aspects of the present disclosure involve systems, methods, computer program products, and the like, for balancing or otherwise selecting among a plurality of network devices to process communications transmitted through a telecommunications network. More particularly, a load balancing unit is associated with a telecommunications network that receives communications intended for transmission through the network and routes the received communications in a balanced manner. In one embodiment, the load balancing unit or component is connected to or in communication with a plurality of network devices, such as a plurality of Session Initiation Protocol (SIP) proxy network devices. The load balancing unit may transmit or route the received communications to the plurality SIP proxy devices such that no one SIP proxy device is overloaded with the processing of the transmitted communications. As such, the load balancing unit provides flexibility in the transmission of the communications through the telecommunications network based on the capabilities and states of one or more network devices. Further, the utilization of the load balancing unit provides a simpler and more efficient network for customers and administrators of the network, to manage, interface with and control the transmission of the communications through the network.

In one particular embodiment of the load balancing component, the load balancer is programmed or otherwise configured to route the communications to the associated network devices based on information concerning the telecommunications network. In particular, the load balancer may utilize information concerning the communication, the associated network devices and/or one or more rules or instructions executed by the load balancer. For example, the load balancer may receive performance capabilities and/or current communication processing states from one or more network components and route a received communication based at least on the received information. Thus, through the use of the load balancer device, a telecommunications network can efficiently route communications through the network so as not to overload a particular network device or devices, while providing a simple interface or connection point into the network to the customers of the network.

In general, the load balancing component of the telecommunications network may be configured to receive any communication transmitted through or otherwise associated with the network. For example, the load balancing component may receive an incoming communication from a user or user network, or may receive an outgoing communication from the network to a user. Thus, although described below as relating to an incoming communication, the load balancing component and methods described herein apply similarly to outgoing communications or to communications transmitted within the network. Further, the load balancing component may be configured to balance communications between a plurality of SIP proxy components of the network. Thus, although described below in relation to Session Border Controller (SBC) devices of the network, the load balancer is configured to balance communications between any type of SIP proxy component of the network. In this manner, the load balancer may determine the next hop in the SIP flow of a communication, whether incoming or outgoing, based on the parameters discussed herein.

Figure 1:
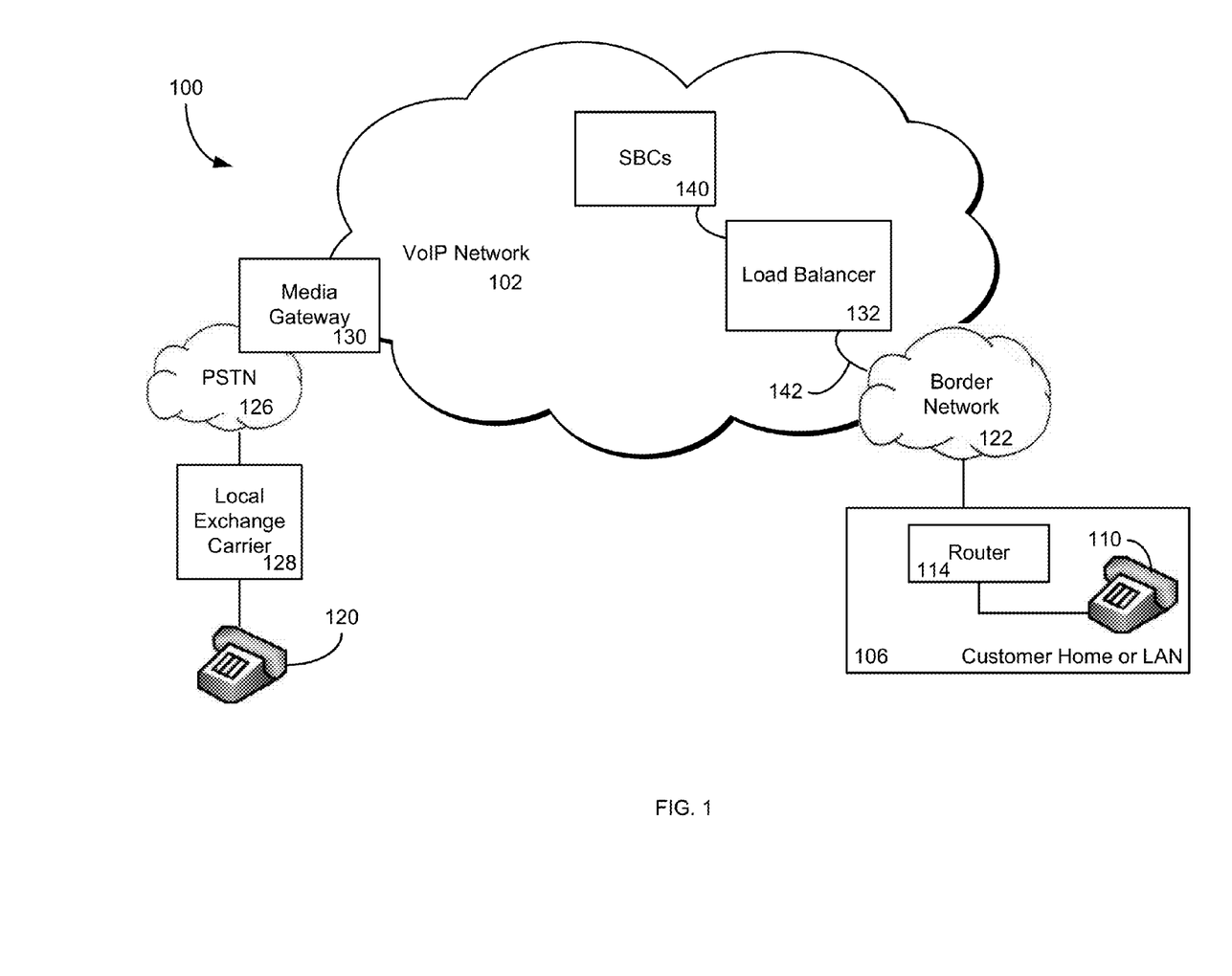
FIG. 1 schematic diagram illustrating an exemplary Voice over Internet Protocol (VoIP) operating environment in accordance with one embodiment.

FIG. 1 illustrates an exemplary operating environment 100 for implementing a load balancer device to balance communications transmitted through the environment. In one embodiment of the operating environment 100, one or more Voice over Internet Protocol (VoIP) communication sessions may be set up between network users using an Internet Protocol (IP) based communication protocol, such as Session Initiation Protocol (SIP). With specific reference to FIG. 1, the environment 100 includes a VoIP network 102 provided by a wholesale network service provider. The VoIP network 102 includes numerous components such as, but not limited to gateways routers, servers and registrars, which enable communication across the VoIP network 102, but are not shown or described in detail here because those skilled in the art will readily understand these components. Additional components include a plurality of SIP proxy components, illustrated in FIG. 1 as SBCs 140, and at least one load balancer unit 132, described in more detail below. Also relevant to this description is the interaction and communication between the VoIP network 102 and other entities, such as the one or more customer home or business local area networks (LANs) 106.

Customer network 106 can include communication devices such as, but not limited to, a personal computer or a telephone 110 connected to a router/firewall 114. The communication and networking components of the customer network 106 enable a user at the customer network 106 to communicate via the VoIP network 102 to other communication devices, such as another customer network and/or an analog telephone 120. Components of the customer network 106 are typically home- or business-based, but they can be relocated and may be designed for easy portability. For example, the telephone 110 may be IP-based wireless device (e.g., cellular, PDA, etc.).

The customer network 106 typically connects to the VoIP network 102 via a border network 122, such as an Internet Service Provider (ISP). The border network 122 is typically provided and maintained by a business or organization such as a local telephone company or cable company. The border network 122 may provide network/communication-related services to their customers. The analog telephone 120 accesses, and is accessed by, the VoIP network 102 via a public switched telephone network (PSTN) 126 and a local exchange carrier (LEC) 128. Communication via any of the networks can be wired, wireless, or any combination thereof. Additionally, the border network 122 and PSTN 126 may communicate, in some embodiments, with the VoIP Network 102 through a media gateway device (130).

One or more trunks 142 may connect the border network 122 to the VoIP network 102. In general, a trunk 142 is a transmission channel between two points, typically between two networks. In an Internet Protocol (IP) environment, the trunks 142 provide the IP interconnect between the border network 122 and the VoIP network 102, such that an IP address is shared between the border network and the VoIP network to communicate between the network devices. In one embodiment of the VoIP network 102, the border network 122 connects to, or otherwise communicates with, one or more session border controllers (SBC) 140 through the trunk 142. One or more trunks may be connected to the SBC 140 such that an SBC device may receive communications from several customers to the network 102.

Typically, SIP proxy components such as the SBCs 140 of FIG. 1 have defined capabilities for processing and transmitting communications. In one example, an SBC 140 may be limited to processing 10,000 communications simultaneously. Also, an SBC 140 may be limited by a communication set up rate that limits the number of communications established, or set up, by the SBC. For example, an SBC 140 may be limited to establishing 200 communications per second. Thus, any SBC 140 receiving communications may become overloaded when the number of communications exceeds the device limitations. For example, a particular customer to a network 102 may request additional ingress ports to the network through a border network 122. Typically, when such situations are expected or ordered, a new trunk 142 may be commissioned between the border network 122 and a newly deployed SBC 140 to handle the increased traffic from a customer or local network 106. However, in these situations, a new IP address is typically created for the new trunk to allow the components of the network 102 to communicate with the newly added customer side devices. Thus, a customer to the VoIP network 102 may have commissioned several trunks and several associated IP addresses to the customer network 106 that the customer must maintain and service. Such maintenance may become troublesome for large customers that utilize a large number of trunks and ports for transmission of large numbers of communications through the network. Further, the components of the network dedicated to these large customers may not operate efficiently as the capabilities of the components are not being used during slow or off-peak operating times.

Figure 2:
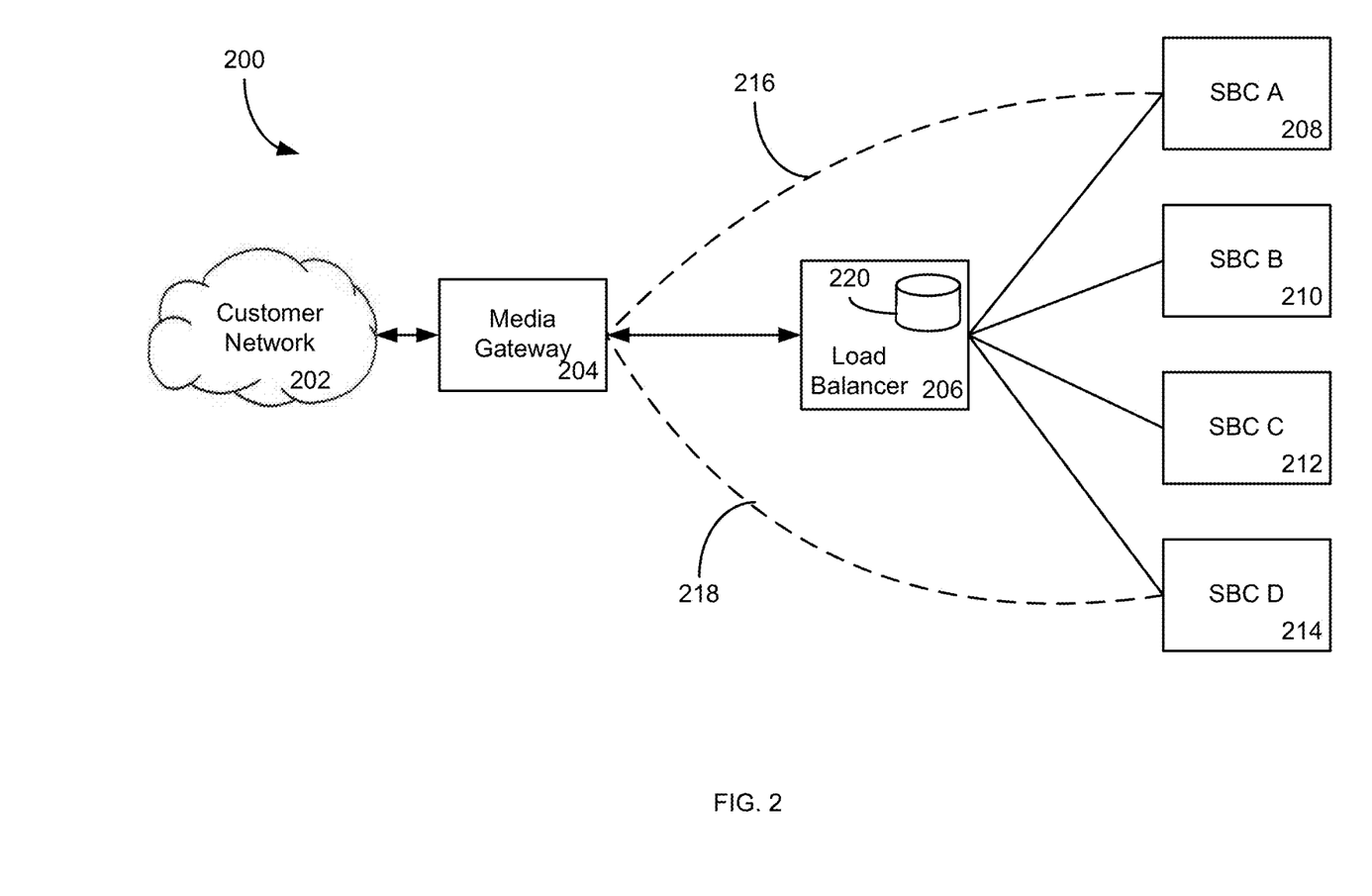
FIG. 2 is a schematic diagram illustrating an exemplary VoIP network incorporating a load balancing unit to balance incoming communications over multiple session border controller devices.

The network illustrated in FIG. 2 thus includes a load balancing unit or "load balancer" 206 to aid in transmission of incoming communications and to reduce the inefficiency of a hard-wired or dedicated network component or components. In general, the load balancer 206 may be configured within the network 200 to receive any communication transmitted through and/or within the network, including communications from the customer network 202 and any associated media gateway 204. The customer network 202 and media gateway 204 may be similar to the border network and media gateway discussed above with reference to FIG. 1. Similarly, the SBCs (208-214) and load balancer 206 are the same as the SBCs and load balancer discussed above with reference to FIG. 1.

In one embodiment of the network of FIG. 2, the load balancer 206 is a standalone component that receives one or more communications for the network. In other embodiments, the load balancer 206 is integrated into a network component, such as an application server. The specific components of the load balancer 206 are described in more detail below with reference to FIG. 5. Further, although shown in FIG. 2 as connecting directly to the media gateway 204 and SBCs (208-214), any number of network components and devices may be connected between the components shown. For simplicity, only the components discussed herein are thus shown. Further, other embodiments of the load balancer 206 may receive outgoing communications from the telecommunications network. However, in such embodiments, the mechanisms and method by which an associated SIP proxy device is selected by the load balancer described herein may equally apply.

In the embodiment illustrated in FIG. 2, the load balancer 206 receives communications from the media gateway 204 or other component associated with a customer network 202. The communications received at the load balancer 206 are SIP-based communications, such that the customer network 202 is an IP-based network and the communications from the customer network utilize SIP as the transmission protocol. The load balancer 206 may also be connected to, or otherwise associated with, a plurality of SIP proxy network devices, illustrated in FIG. 2 as SBC devices (208-214). While FIG. 2 illustrates four such SBC devices (208-214) associated with the load balancer 206, it should be appreciated that any number of such devices or any other type of network component may be associated with the load balancer to receive communications from the customer network 202. Further, it is not required that the load balancer 206 be associated with SBC-type devices. Rather, the load balancer 206 may be connected to any type of SIP proxy networking devices that can process and/or transmit a communication on the network. For example, one or more routers or switching devices may be connected to the load balancer 206 to receive the communications.

As mentioned above, the SBC devices (208-214) may have technical limitations associated with the device that limits the number of communications that can be processed by the SBC, including the overall number of simultaneous communications processed by the SBC and number of communication sessions set up per second. Transmitting too many incoming communications to an SBC that exceeds the technical capabilities of the device may cause the SBC to overload, thereby degrading the communication service provided by the network. To prevent any one SBC device from being overloaded with communications, the load balancer 206 may be configured to route the incoming communications accordingly to a balancing protocol such that the communications are spread over multiple SBC devices for processing. As explained in more detail below, any information associated with the communication, the technical limitations of the associated SBC devices and/or balancing rules maintained by the load balancer may be stored in a database 220 associated with the load balancer and utilized by the load balancer to determine to which SBC (208-214) the communication is routed. Further, in one embodiment, the load balancer 206 may be configured to provide SIP-based signaling operations to establish a communication session between the media gateway 204 and the selected SBC (208-214). Once the communication session has been established through the SIP-based signaling, the packets comprising the audio and/or video components of the communication may bypass the load balancer 206 and be transmitted to the selected SBC.

During operation of the load balancer 206, a communication is transmitted by the media gateway 204 to the load balancer. The load balancer 206, utilizing any number of rules and/or obtained information concerning the communication and maintained in the associated database 220, selects one of the SBCs (208-214) associated with the load balancer for processing and transmission of the communication through the network. The load balancer 206 may then utilize signaling information with the communication, such as a header of an SIP-based communication, to route the communication to the selected SBC, such as SBC A 208. Once the communication is established between the media gateway 204 and the SBC A 208, the packets that comprise the media component of the communication are transmitted through the network to the selected SBC such as to bypass the load balancer 206, as shown by communication line 216. In this manner, the load balancer 206 may process SIP-based communications to the one or more SBC devices (208-214). In another example, the load balancer 206 selects SBC D 214 for processing and transmission of an incoming communication. Once selected, the load balancer 206 transmits one or more SIP-based messages, with a header included information about the routing of the communication, to the customer network 202 and SBC D 214 such that the media portion of the communication is transmitted 218 to the SBC from the customer's network (and associated media gateway 204), bypassing the load balancing component 206.

To select which SBC receives the one or more communications from the customer network 202, the load balancer 206 may be configured to execute one or more selection rules stored in a database 220 associated with the load balancer. In one embodiment, the load balancer 206 may be programmed to provide a pre-determined number of communications to each SBC. For example, the load balancer 206 may provide 100 concurrent communications to SBC A 208, 200 concurrent communications to SBC B 210, 1000 concurrent communications to SBC C 212, and so on. The number of concurrent communications provided to the SBCs (208-214) may be dependent on the technical limitations of the SBCs, such at the maximum number of concurrent communications that can be processed by the SBC and the number of communication sessions that can be established by the SBC at any one time. For example, SBC A 208 may be configured to process fewer concurrent communications than SBC C 212. These technical limitations of the SBC A 208 and SBC C 212 may be obtained by the load balancer 206, either through receiving the information or through a query of the SBC devices, and stored in the associated database 220. In addition, the load balancer 206 may receive information concerning the current operational state of the SBCs (208-214), such as the number of communication sessions currently being established by the SBC device. With this information retrieved from the database 220, the load balancer 206 may route fewer communications to SBC A then to SBC C 212.

As mentioned, the load balancer 206 may maintain information concerning each SBC (208-214) connected to the load balancer in the database 220 to determine the number of concurrent communications provided to each SBC. In one embodiment, the load balancer 206 may be programmed or otherwise updated with information about the SBCs (208-214) connected to the load balancer. In another embodiment, the load balancer 206 may query each SBC (208-214) and receive the capacity limitations of the SBCs and the current load of communications on any one SBC at the time of the query. This information may be stored in the database 220 and utilized by the load balancer when selecting and SBC device (208-214) to route the communication in a manner as to avoid overloading any one SBC device.

To maintain the information of the technical aspects of the SBCs (208-214), the load balancer includes a database 220 that keeps a record of each SBC associated with the load balancer 206 and at least one technical detail of the SBCs. Further, when an SBC or other networking device is connected to the load balancer 206, the database 220 may be manually updated by a network administrator with the technical aspects of the newly added device. In another embodiment, the load balancer 206 may be configured to query the newly added device for technical information and/or the newly added device may be configured to transmit said information to the load balancer upon being connected. Also, the load balancer 206 may be configured to obtain operational states of the associated SBC devices (208-214), such as the number of communications being processed by the SBC at any one time. This information may be queried by the load balancer 206 or may be transmitted by the SBCs (208-214) to the load balancer at regular intervals. In this manner, the load balancer 206 maintains an up-to-date record of the available SBCs (208-214) and other connected network devices that may be selected for processing of the communication and utilizes this information to select the processing component of the network.

In one embodiment, the load balancer 206 may store one or more routing rules in the database 220 and utilize the rules to determine which SBC routes the received communication. For example, a routing rule may instruct the load balancer 206 to route the received communications to the SBCs in a round-robin fashion. Thus, a first communication or group of communications may be routed to SBC A 208 by the load balancer 206, a second communication or group of communications may be routed to SBC B 210, a third communication or group of communications may be routed to SBC C 212, and so on, regardless of the capacity or technical limitations of the SBC devices as instructed by the stored routing rule. In this embodiment, the number of SBCs associated with the load balancer 206 may be great enough to prevent any one SBC from becoming overloaded. Similarly, another embodiment of the load balancer 206 may provide communications to SBC A 208 until SBC A has reached its technical limitations, at which time the routing rule instructs the load balancer to begin to provide communications to SBC B 210, and so on. In this manner, the stored routing rules determine which SBC device (208-214) is selected by the load balancer 206 to process an incoming communication.

Other technical aspects of the SBCs (208-214) connected to the load balancer 206 may also be considered by the load balancer in selecting which SBC receives the communication. For example, each SBC (208-214) may be limited to a number of established or set-up communication sessions per second, such as 400 communications per second. The load balancer 206 may retain or receive such technical limitations concerning the SBCs (208-214) in the database 220 and, in response to this stored technical information of the SBC, may route incoming communications accordingly to prevent overloading any one SBC. Similarly, the associated SBCs (208-214) may utilize particular transmission protocols while the load balancer 206 may accept incoming communications of many types of protocols. In this situation, the load balancer 206 may select the proper SBC to route the communication based on the protocol of the communication. For example, a particular SBC associated with the load balancer 206 may be configured to process video-based communications, while other SBCs may be configured to process only audio-based communications. The load balancer 206 may identify the type of communication, and in particular the protocol or codec of the incoming communication, and route the communication to the proper SBC based on the protocol capabilities of the SBCs (perhaps based on the information concerning the SBCs (208-214) stored in the database 220).

Figure 3:
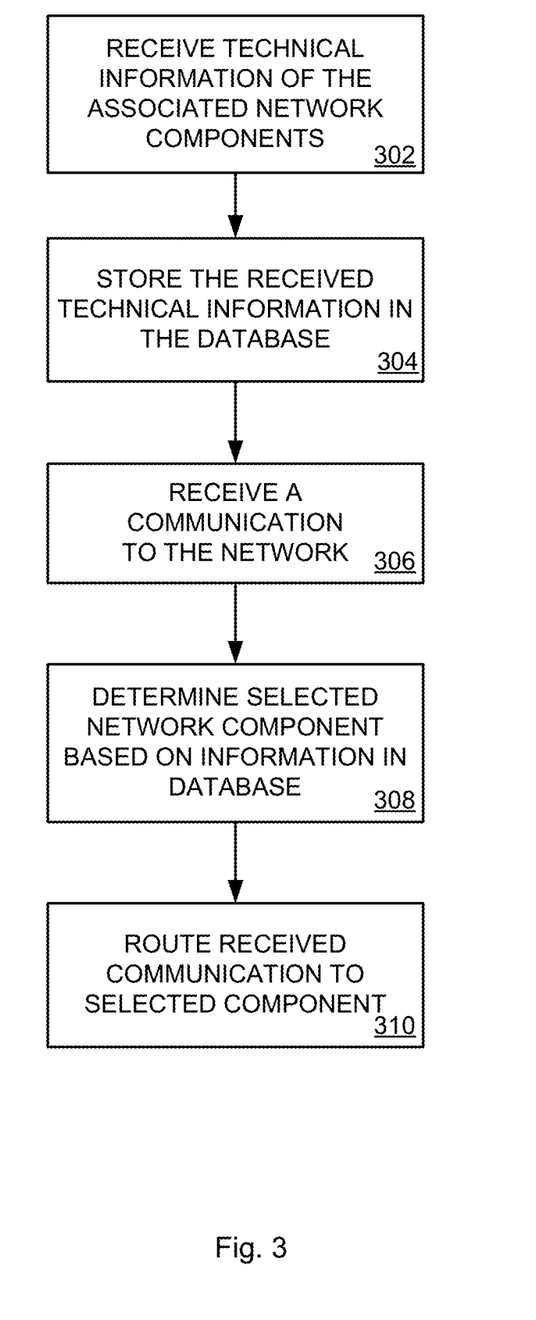
FIG. 3 is a flowchart illustrating a method for a load balancing unit of a telecommunications network to route one or more communication messages.

FIG. 3 is a flowchart illustrating a method for a load balancing unit of a telecommunications network to route one or more communication messages. In general, the operations of the method of FIG. 3 may be performed by the load balancer component 206 described above. Further, the method may be performed to facilitate at least one of the operations of the load balancer described above. For example, the load balancer may perform the method of FIG. 3 to route an incoming communication to an SBC based on the protocol used to transmit the communication through the network.

Beginning in operation 302, the load balancer may receive technical information concerning one or more of the network components, such as a SIP proxy device, associated with the load balancer. For example, the network component may be configured to limit the number of communications that can be processed by the component, may be configured to process certain communication protocols and/or may provide information about an operating state of the component. In general, any of the technical information of a network component discussed above may be received by the load balancer in operation 302. Further, the technical information may be received by an administrator of the network, may be received in response to a query by the load balancer, or may be received from the component, and the like.

In operation 304, the load balancer stores the received information in a database associated with the load balancer. In one embodiment, the load balancer maintains a database of the associated network components to the load balancer and any technical information received by the load balancer. In operation 306, the load balancer receives a communication transmitted through or within the telecommunications network. As described in the embodiment above, this communication may be received from a customer through a customer network and/or media gateway connected to the telecommunications network.

Upon receiving the communication, the load balancer determines, in operation 308, a selected network component through which the received communication is to be routed through. In particular, the load balancer utilizes information stored in the database, such as the technical information stored in the database for the network components, to determine the selected network component. For example, the load balancer may, upon receiving the communication, determine that the communication is in a particular transmission protocol. Further, by analyzing the technical information stored in the database, the load balancer may determine that only one of the associated network components is configured to process communications of that type of protocol. In this example, the load balancer may then select the network component with the particular transmission protocol to which the communication is routed.

In another example, the load balancer may analyze the stored information and determine that one of the associated network components is processing fewer communications than the other components. In this example, the load balancer may then select the network component with the fewest processing communications. In addition to analyzing the stored technical information in operation 308, the load balancer may also select a network component based on one or more routing rules also stored in the database. For example, a stored routing rule may instruct the load balancer to select the network component with the fewest processing communications, or the network component that most closely matches the protocol of the received communication. Further, the routing rule may include several routing rules, set up in a hierarchy, to account for more than one routing rule applying to the received communication. Thus, matches of the received communication with certain technical information of the network components may be given more weight than other matches. In this manner, through an analysis of the stored technical information and the application of the routing rules stored in the database, the load balancer may select an associated network component in operation 308.

Once a network component is selected, the load balancer may route the received communication to the selected network component in operation 310. In particular, the load balancer may transmit one or more routing messages to the selected network component and the customer network to route the media portion of the communication through the selected network component. In one example, the load balancer transmits one or more SIP-based routing messages to the selected network component and the customer's network, with routing information contained within the header portion of the routing messages. In the manner, the load balancer of the network may actively select network components through which communications are routed. The flexibility of active routing of the communication through the network, in comparison to a hard-wired or dedicated network architecture, provides ease of maintenance and a higher efficiency network structure.

In addition, the load balancer 206 may also provide an interface to normalize the signaling protocol for received communications. As described above, the load balancer 206 may be configured to receive communications of varying signal protocols. However, at least one of the SBCs (208-214) or a plurality of SBCs may be configured to process only certain types of signaling protocols of the communications. In this situation, the load balancer 206 may be configured to normalize the received communications into a signaling protocol that is recognized and can be processed by the SBCs (208-214). For example, SBC A 208 may be configured to only support communications utilizing the G.711 codec such that only communications of that type can be processed by SBC A. The load balancer 206, however, may be configured to process communications of several types of signaling protocols and convert those communications into a G.711-type communication. Thus, after conversion, the load balancer 206 may select SBC A 208 for the processing of the communication, even though the communication originated in a codec that is not supported by SBC A.

Further, the load balancer 206 may be configured to identify missing information in the communication and attempt to recreate the missing information to process the communication. For example, the communication may arrive at the load balancer 206 with one or more packets missing or corrupted. The load balancer 206, in response, may attempt to recreate the missing or corrupted packets, potentially by normalizing the signaling protocol used by the communication to a more robust protocol. Once the communication information is recreated, the load balancer 206 may then select an appropriate SBC for communication processing, as explained above.

In another embodiment, the load balancer 206 may provide additional security or encryption to the communication that provides a secured communication across network. In one example, the signaling information of the communication may be encrypted using known encryption techniques, such as the use of security certificates that verify the authenticity of a communication. However, certain SBCs (208-214) may not support the use of certain types of encryption or the various SBCs may require a plurality of encryption techniques based on the technical limitations of the SBCs. The load balancer 206, therefore, provides a single access point that may be configured to handle the encryption and security protocols for communications through the network 200. Thus, the load balancer 206 may be configured to verify the security certificates associated with received communications. In this manner, any type of encryption technique supported by the load balancer 206 may be processed to any SBC (208-214).

In another embodiment, the load balancer 206 may be configured to recognize the type of communication and select the SBC accordingly. For example, the load balancer 206 may recognize that a communication is a 911 or other emergency-type communication. In this situation, the load balancer 206 may execute a rule to select an SBC that is designated for emergency communications. In general, the load balancer 206 may select any SBC based on the type of communication received.

Figure 4:
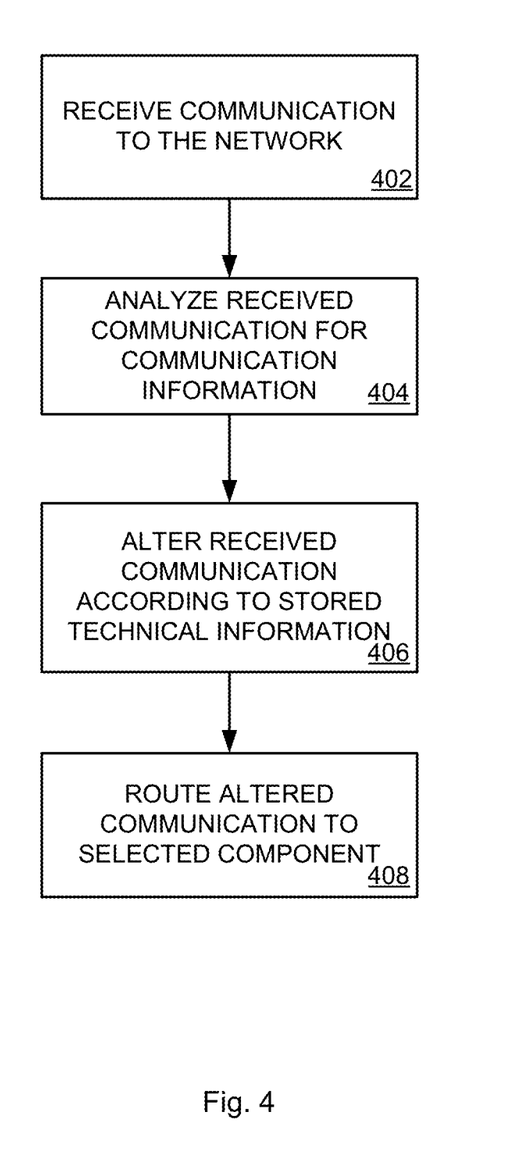
FIG. 4 is a flowchart illustrating a method for a load balancing unit of a telecommunications network to alter one or more communication messages to aid in the transmission of the communication messages through the network.

FIG. 4 is a flowchart illustrating a method for a load balancing unit of a telecommunications network to alter one or more received communication messages to aid in the transmission of the communication messages through the network. In general, the operations of the method of FIG. 4 may be performed by the load balancer component 206 described above. Further, the method may be performed to facilitate at least one of the operations of the load balancer described above that alter or tailor the received communication for routing to the associated network elements. For example, the load balancer may perform the method of FIG. 4 to alter a received communication prior to routing the communication to an SBC. In addition, the load balancer may perform the operations of FIG. 4 in conjunction with or separate from the operations of FIG. 3.

Beginning in operation 402, the load balancer receives a communication from a network device, such as a customer network or media gateway component of the network. In operation 404, the load balancer analyzes the received communication. Such analysis may include determining the transmission protocol of the communication, the intended destination of the communication, whether the communication is an emergency communication, and the like.

In operation 406, the load balancer may alter the received communication based on the analysis conducted in operation 404. For example, the load balancer may encrypt the received communication or transform the communication into a protocol supported by one or more of the associated network components. Thus, in one embodiment, the load balancer may also retrieve and analyze the technical information for the one or more associated network components to determine which protocol the received message should be transferred into. In general, the load balancer may alter the received communication in any manner to aid in the routing of the communication through the network.

In operation 408, the load balancer may then route the altered communication to a selected network component. Such a component may be selected through the operations illustrated in FIG. 3, discussed above. To route the altered communication to the selected network component, the load balancer may transmit one or more SIP-based messages to establish a communications session between the selected component and the customer network, as described in more detail above.

Included above are several examples and embodiments of the load balancer 206 and the different ways in which the load balancer may select a SIP proxy or "next-hop" network device for processing of a received communication. In general, the load balancer 206 may identify any information contained in the signaling information of a communication and used that information to select a SIP proxy component. Further, the load balancer 206 may either maintain information about some or every SIP proxy component connected to the load balancer for use in selecting the SIP proxy components. Also, the load balancer 206 may execute one or more rules to determine which SIP proxy component is selected for processing of a communication.

Figure 5:
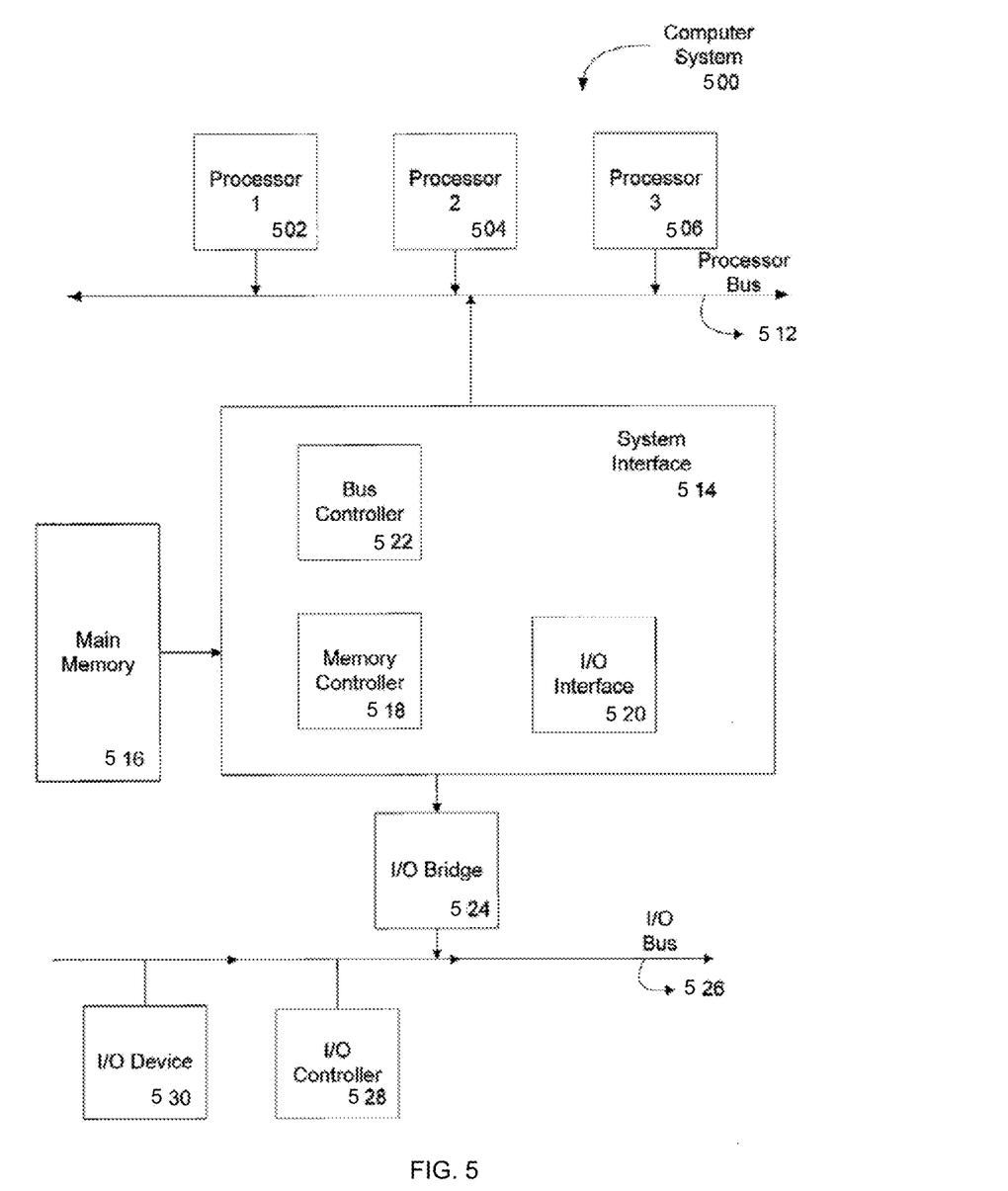
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the load balancer disclosed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A system for processing a communication over an Internet Protocol (IP) based communication network, the system comprising:
   a plurality of SIP proxy components in a telecommunications network;
   a load balancing device in communication with the plurality of SIP proxy components and in communication with at least one user device, the load balancing device is configured to receive a first communication from the at least one user device and the load balancing device is configured to select one SIP proxy component from the plurality of SIP proxy components to process the first communication,
   wherein the load balancing device is further configured to transmit one or more Session Initiation Protocol (SIP) based messages to the selected one SIP proxy component and also to the at least one user device to route the first communication to the selected one SIP proxy component;
   a database associated with the load balancing device; and
   wherein the load balancing device is further configured to receive information from the plurality of SIP proxy components and store the information in the database, the received information comprising at least one technical limitation of each of the plurality of SIP proxy components, and the technical information comprising at least a transmission protocol of each of the plurality of SIP proxy components;
   wherein the load balancer device is further configured to analyze the first communication and convert the transmission protocol of the first communication to a common protocol of the telecommunications network.

2. The system of claim 1 further comprising wherein the load balancing device is further configured to select the selected one SIP proxy component from the plurality of SIP proxy components based at least on the stored received information from the plurality of SIP proxy components.

3. The system of claim 1 wherein the load balancing device is further configured to access one or more routing rules stored in the database, wherein the one or more routing rules comprise an upper limit on the number of concurrent communications associated with each of the plurality of SIP proxy components.

4. The system of claim 1 wherein the received information from the plurality of SIP proxy components further comprises a transmission protocol associated with each of the plurality of SIP proxy components and the load balancing device is configured to select the selected one SIP proxy component from the plurality of SIP proxy components based at least in part on the transmission protocol associated with each of the plurality of SIP proxy components.

5. The system of claim 1 wherein the at least one technical information of each of the plurality of SIP proxy components comprises a limit of a number of communication sessions established by each of the SIP proxy components per second.

6. The system of claim 1 wherein the plurality of SIP proxy components comprise a plurality of Session Border Controller devices.

7. A method for processing a network communication to a telecommunications network, the method comprising:
   obtaining, at a load balancer, technical information of at least one network component of a plurality of network components, wherein each of the plurality of network components is in communication with the load balancer and the technical information of the at least one network component comprises a transmission protocol supported by the at least one network component;
   storing the received technical information in a database associated with the load balancer;
   receiving, at the load balancer, a user communication intended for transmission on a telecommunications network, the user communication transmitted by a user device associated with a user network in communication with the telecommunications network;
   analyzing the user communication to determine a transmission protocol for the user communication;
   converting the user communication to a transmission protocol corresponding to the technical information of the at least one network component;
   selecting a first network component from the plurality of network components, wherein the selecting the first network component is based at least on the received technical information of the at least one network component; and
   transmitting at least one routing message to establish a communication session between the user device and the first network component.

8. The method of claim 7 wherein the obtaining operation comprises:
   transmitting an information request from the load balancer to each of the plurality of network components, the information request comprising at least one instruction to each of the plurality of network components to transmit the technical information to the load balancer.

9. The method of claim 7 further comprising:
   accessing at least one routing rule stored in the database and wherein the selecting of the first network component is further based at least on the at least one routing rule.

10. The method of claim 7 further comprising:
    detecting a new network component in communication with the load balancer;
    querying the new network component for technical information of the new network component; and
    storing the technical information of the new network component in the database.

11. The method of claim 7 wherein the at least one routing message comprises a Session Initiation Protocol (SIP) based message comprising routing information in a header portion of the message.

12. The method of claim 7 wherein the technical information comprises a limit of a number of communication sessions established per second by the at least one network component.

13. The method of claim 7 wherein the plurality of network components comprises a plurality of session border controller (SBC) components of the telecommunications network.

14. The method of claim 7 further comprising:
selecting the first network component based on the transmission protocol of the user communication and the technical information of the at least one network component.

15. A method for operating a telecommunications network, the method comprising:
obtaining, at a load balancer, technical information of at least one network component of a plurality of network components, wherein each of the plurality of network components is in communication with the load balancer and the technical information comprises at least a transmission protocol of each of the plurality of network components;
storing the received technical information in a database associated with the load balancer;
receiving, at the load balancer, a communication intended for a telecommunications network, the received communication transmitted by a user device associated with a user network in communication with the telecommunications network;
analyzing the received communication to determine a transmission protocol of the received communication;
converting the received communication to a transmission protocol corresponding to the technical information of the at least one network component; and
transmitting at least one routing message to establish a communication session between the user device and the at least one network component.

16. The method of claim 15 further comprising:
determining if the received communication is an emergency communication, and wherein the at least one network component is configured to process emergency communications.

17. The method of claim 15 wherein the at least one routing message comprises a Session Initiation Protocol (SIP) based message comprising routing information in a header portion of the message.

18. The method of claim 15 further comprising:
selecting the at least one network component from the plurality of network components based at least on a routing rule stored in the database.

* * * * *